US012675582B2

(12) United States Patent
Bachmann et al.

(10) Patent No.: US 12,675,582 B2
(45) Date of Patent: Jul. 7, 2026

(54) PREVENTING RESOURCE BREACHES IN A CLOUD COMPUTING SYSTEM CAUSED BY NEW CODE-BASED INFRASTRUCTURES USING PREVENTATIVE PATTERN-BASED ANALYSIS

(71) Applicant: Microsoft Technology Licensing, LLC, Redmond, WA (US)

(72) Inventors: Kyle Stephen Bachmann, Renton, WA (US); Shamailah Tooba Azam, Seattle, WA (US); George Kenneth Ringer, Mercer Island, WA (US); Mason Adam Blalock, Issaquah, WA (US); Richard Poe Kochert, Seattle, WA (US)

(73) Assignee: Microsoft Technology Licensing, LLC, Redwood, WA (US)

( * ) Notice: Subject to any disclaimer, the term of this patent is extended or adjusted under 35 U.S.C. 154(b) by 22 days.

(21) Appl. No.: 18/893,284

(22) Filed: Sep. 23, 2024

(65) Prior Publication Data

US 2026/0087141 A1      Mar. 26, 2026

(51) Int. Cl.
G06F 21/57 (2013.01)
G06F 21/53 (2013.01)
G06F 21/55 (2013.01)
(52) U.S. Cl.
CPC ............ G06F 21/577 (2013.01); G06F 21/53 (2013.01); G06F 21/554 (2013.01)
(58) Field of Classification Search
CPC ....... G06F 21/577; G06F 21/53; G06F 21/554

(Continued)

(56) References Cited

U.S. PATENT DOCUMENTS

| 10,929,531 | B1 * | 2/2021 | Kenemer | .............. | G06F 18/214 |
| 2012/0159180 | A1 * | 6/2012 | Chase | ................... | H04L 9/0869 |
| | | | | | 713/184 |

(Continued)

OTHER PUBLICATIONS

Dissi, Prince, "Mapping the Cyber Terrain: The Indispensable Role of Network Topology in Cybersecurity Strategy", Retrieved from: https://www.linkedin.com/pulse/mapping-cyber-terrain-indispensable-role-network-prince, May 30, 2023, 4 Pages.

(Continued)

*Primary Examiner* — Teshome Hailu
(74) *Attorney, Agent, or Firm* — Ray Quinney & Nebeker P.C.; Christopher K. Hallstrom

(57) ABSTRACT

This disclosure describes a preventative breach detection system that detects and addresses potential resource breaches in candidate code-based infrastructure templates before deployment in a production environment within a cloud computing system. For example, the preventative breach detection system provides a preemptive security framework that utilizes hybrid pattern-based data structures, security pattern analysis, and resource vulnerability patterns to determine the security posture of a candidate code-based infrastructure based on its potential impact on the surrounding infrastructure in the production environment. By doing so, the preventative breach detection system quickly detects potential new resource breaches or changes in the security threat levels that may occur before the candidate code-based infrastructure is introduced into the production environment of the cloud computing system.

20 Claims, 7 Drawing Sheets

(58) Field of Classification Search
　　USPC ........................................................ 726/22
　　See application file for complete search history.

(56) References Cited

U.S. PATENT DOCUMENTS

| | | | |
|---|---|---|---|
| 2013/0067090 A1* | 3/2013 | Batrouni | ............. H04L 67/1097 |
| | | | 709/226 |
| 2015/0040217 A1* | 2/2015 | Abuelsaad | ......... H04L 63/1408 |
| | | | 726/22 |
| 2018/0132105 A1* | 5/2018 | Nealis | ................... H04W 12/08 |
| 2018/0276396 A1* | 9/2018 | Yablokov | ............. G06F 21/604 |
| 2023/0161614 A1 | 5/2023 | Raaz | |
| 2023/0208882 A1 | 6/2023 | Jason | |
| 2023/0319081 A1 | 10/2023 | Fainberg | |
| 2024/0064174 A1 | 2/2024 | Molzon | |

OTHER PUBLICATIONS

International Search Report and Written Opinion received for PCT Application No. PCT/US2025/038998, mailed on Nov. 4, 2025, 14 pages.

Non-Final Office Action mailed on Jan. 16, 2026 in U.S. Appl. No. 18/930,621, 12 Pages.

* cited by examiner

Updated Candidate Graph 302

Current Deployment Resources 310

Overlap Resources 320

Non-Template Nodes 332

New Template Nodes 334

Merged Graph 330

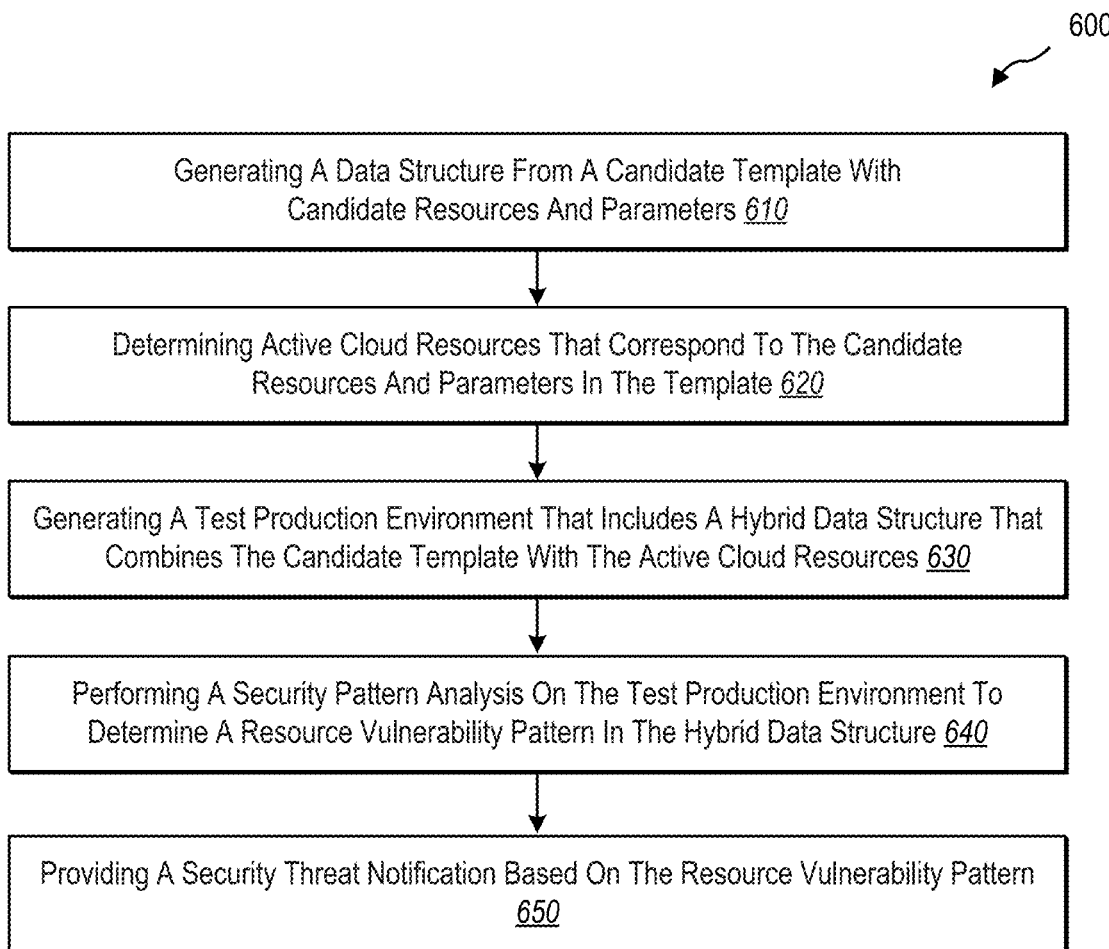

600

Generating A Data Structure From A Candidate Template With
Candidate Resources And Parameters _610_

Determining Active Cloud Resources That Correspond To The Candidate
Resources And Parameters In The Template _620_

Generating A Test Production Environment That Includes A Hybrid Data Structure That
Combines The Candidate Template With The Active Cloud Resources _630_

Performing A Security Pattern Analysis On The Test Production Environment To
Determine A Resource Vulnerability Pattern In The Hybrid Data Structure _640_

Providing A Security Threat Notification Based On The Resource Vulnerability Pattern
_650_

PREVENTING RESOURCE BREACHES IN A CLOUD COMPUTING SYSTEM CAUSED BY NEW CODE-BASED INFRASTRUCTURES USING PREVENTATIVE PATTERN-BASED ANALYSIS

BACKGROUND

In an era of increasing cybersecurity threats, infrastructure pattern analysis has been instrumental in identifying vulnerabilities, such as misconfigurations or bugs, that pose risks in cloud computing systems. Some existing cloud infrastructure security systems perform threat detection scans of production environments to detect these vulnerabilities. However, these scans often analyze the entire production environment and can take hours or even days to complete, depending on the size of the cloud computing system. As a result, by the time a security threat is detected, the security threat has already been active within the production environment. Moreover, existing systems not only need to neutralize the security threat but also repair the infrastructure in the production environment around the threat, which may introduce additional undetected security threats. These issues, along with others, are prevalent in existing cloud infrastructure security systems.

BRIEF DESCRIPTION OF THE DRAWINGS

The following detailed description provides specific and detailed implementations accompanied by drawings. Additionally, each of the figures listed below corresponds to one or more implementations discussed in this disclosure.

FIG. 6 illustrates an example series of acts of a computer-implemented method for preventing resource breaches in a cloud computing system.

DETAILED DESCRIPTION

Figure 1:
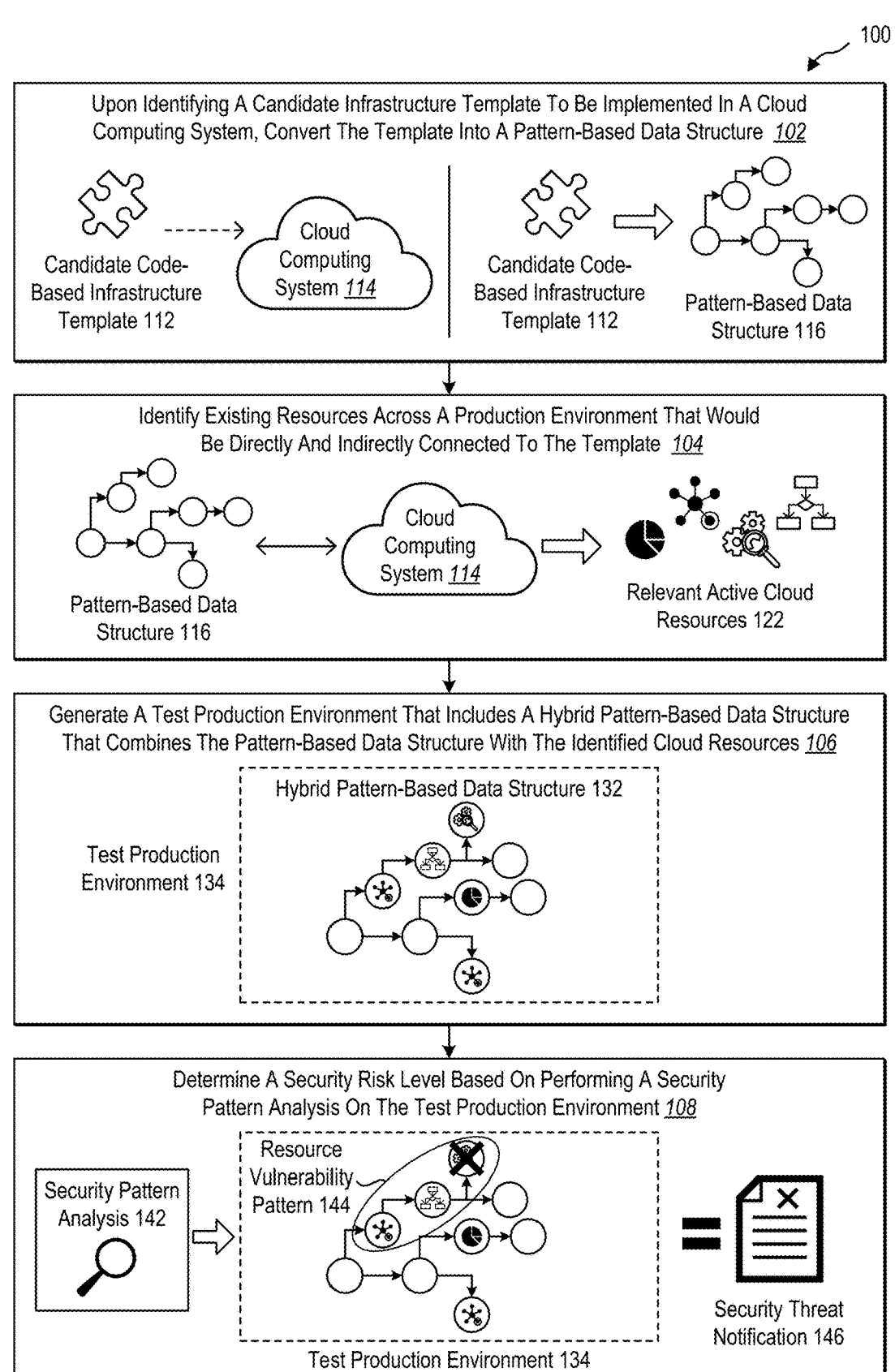
FIG. 1 illustrates an example overview of implementing the preventative breach detection system to determine and prevent security threats caused by new code-based infrastructure before the security threats are implemented in a production cloud environment.

This disclosure describes a preventative breach detection system that detects and addresses potential resource breaches in candidate code-based infrastructure templates before deployment in a production environment within a cloud computing system. For example, the preventative breach detection system provides a preemptive security framework that utilizes hybrid pattern-based data structures, security pattern analysis, and resource vulnerability patterns to determine the security posture of a candidate code-based infrastructure based on its potential impact on the surrounding infrastructure in the production environment. By doing so, the preventative breach detection system quickly detects potential new resource breaches or changes in the security threat levels that may occur before the candidate code-based infrastructure is introduced into the production environment of the cloud computing system.

Implementations of the present disclosure provide benefits and solve problems in the art with systems, computer-readable media, and computer-implemented methods that utilize a preventative breach detection system. To elaborate, the preventative breach detection system implements a preemptive security framework that creates a limited test production environment of a cloud computing system. This test production environment allows for the evaluation of candidate code-based infrastructure templates for security breaches and threats using real-world conditions, without the consequences of live deployment in a production environment. Additionally, the preventative breach detection system identifies resource breaches and vulnerabilities much more quickly than existing systems.

To illustrate, in various implementations, the preventative breach detection system prevents resource breaches in a cloud computing system by generating a pattern-based data structure from a candidate code-based infrastructure template. This candidate template includes candidate cloud infrastructure resources and candidate parameters (e.g., template provisions cloud infrastructure resources according to defined parameters to implement one or more target cloud-based applications). In addition, the preventative breach detection system determines related active cloud resources in an active cloud computing system that correspond to the candidate cloud infrastructure resources and parameters in the template.

Continuing from above, the preventative breach detection system also generates a hybrid pattern-based data structure in a test production environment where the hybrid pattern-based data structure combines the candidate template with the related active cloud resources. Additionally, the preventative breach detection system determines a resource vulnerability pattern in the hybrid pattern-based data structure based on performing a security pattern analysis on the test production environment. Based on determining that the resource vulnerability pattern satisfies or meets a security threat threshold, the preventative breach detection system provides a security threat notification. In some instances, the security threat notification is accompanied by preventative actions.

As described in this disclosure, the preventative breach detection system delivers several significant technical benefits in terms of improved computing security and efficiency compared to existing cloud infrastructure security systems that utilize generative AI image models. Moreover, the preventative breach detection system provides several practical applications that address problems related to identifying and preventing resource breaches introduced in cloud computing systems when deploying or binding new or updated code-based infrastructure.

As a high-level context, many cloud computing systems provide a variety of services and applications to users. These tools and services are supported by a backend code-based infrastructure, known as infrastructure-as-code (IaC). Code-based infrastructure enables cloud environment providers to efficiently share the same physical resources (e.g., hardware devices) among clients and entities. To prevent any cross-over or overlap, a cloud computing system typically organizes the code-based infrastructure and cloud-based resources into tenants, resource groups, and/or subscriptions.

However, the use of code-based infrastructure and shared resources also introduces security risks. For instance, an unpatched vulnerability in a code-based infrastructure tool could potentially serve as an entry point or gateway for threats to the core infrastructure. Similarly, misconfigurations in code-based infrastructure templates could inadvertently expose sensitive data or create openings for attacks. Unauthorized entry into cloud resources in a cloud computing system is referred to as a resource breach. The severity of security threats escalates when a resource breach not only compromises the core of the cloud computing system but also provides access to other subscriptions, resource groups, or tenants within the system.

In the context of security resource breaches, understanding the concepts of breach paths, pivots, and blast radii is crucial to mitigating security risks. As an example, a breach path refers to a sequence or chain of cloud resources, starting at an exploited resource, that an attacker navigates to reach a pivot resource. A pivot is a cloud resource within the cloud computing system that enables access to cloud resources through lateral movement and connections. For example, a pivot resource allows an attacker to access other parts of the system, escalate their privileges, and reach more sensitive data. A blast radius refers to the extent of potential damage or disruption caused by a security breach. It encompasses all the resources that could be affected directly or indirectly. The larger the blast radius, the more significant the potential impact of a breach.

While some existing cloud infrastructure security systems identify resource breaches caused by a newly implemented code-based infrastructure template, these security threats are identified, at best, hours after the new code-based infrastructure is activated and running. Furthermore, many existing cloud infrastructure security systems can only determine security threats in newly implemented code-based infrastructure based on performing a security scan of most or all of the cloud computing system, which requires significant time and computing resources to evaluate an entire production environment.

In contrast to existing systems, the preventative breach detection system detects and addresses potential resource breaches in candidate code-based infrastructure templates before deployment or binding in a production environment within a cloud computing system. Indeed, the preventative breach detection system accurately and proactively assesses the security impact of code-based infrastructure templates before they are deployed, which eliminates or minimizes security threats. In addition, real-time feedback can be provided to correct and address errors and threats rather than reporting problems and issues later in the future when developers have moved to other projects.

Additionally, unlike existing systems that require hours or days to determine whether cloud resources provisioned by a new code-based infrastructure template pose a security risk, the preventative breach detection system can efficiently determine these security risks in minutes (e.g., 60-90 seconds). Furthermore, the preventative breach detection system may operate as an integrative solution before deployment to ensure that requested deployment packages do not introduce additional risk to the production environment.

To elaborate, the preventative breach detection system creates a test production environment that includes a hybrid pattern-based data structure, such as a hybrid graph, that combines resources and parameters from a candidate code-based infrastructure template with the related active cloud resources. Analyzing a template by itself is not sufficient because it fails to identify how implementing the template will affect currently active cloud resources in the cloud computing system directly or indirectly related to the template. Accordingly, the preventative breach detection system identifies all of the cloud resources that are impacted by the template and generates a small test production environment that functions as if the template (e.g., the candidate template) was deployed in the production environment. The preventative breach detection system then runs a security pattern analysis on the test production environment to assess the full effects of deploying the candidate code-based infrastructure template. Because the test production environment is a fraction of the size of the production environment, the preventative breach detection system identifies security threats more quickly and efficiently as well as with high precision, as further described below.

As illustrated in the foregoing discussion, this disclosure utilizes a variety of terms to describe the features and advantages of the preventative breach detection system. To illustrate, this disclosure describes the preventative breach detection system in the context of a cloud computing system. As an example, the term "cloud computing system" refers to a network of interconnected computing devices that provide various services and applications to computing devices (e.g., server devices and client devices) inside or outside of the cloud computing system. An example of a cloud computing system is described below in connection with FIG. 2.

As another example, the term "code-based infrastructure template" (or template for short) refers to a code-based file that, when deployed into a cloud environment, defines the infrastructure and configuration of a cloud-based application or project. A template is used to define and provision infrastructure resources necessary to support cloud-based applications. Depending on the type, a template includes built-in parameters (e.g., a static template) that define how infrastructure and/or resources should be provisioned when deployed. In some instances, a template dynamically provides a set of configurable or tunable parameters. For instance, a template file is deployed with a parameter file that indicates how to populate environment-specific resources. In some instances, templates act as recipes for performing cloud services and functions based on implementing the ingredients (e.g., the infrastructure resources) and amounts (e.g., the parameters).

In this document, a template is often a candidate template (i.e., a candidate code-based infrastructure template) that includes candidate cloud infrastructure resources and candidate parameters. As an example, the term "candidate template" refers to a template that is ready to be deployed or bound into a production environment of a cloud computing system. The term "candidate cloud infrastructure resources" (or candidate resources for short) refers to resources within the template to be deployed. Similarly, the term "candidate parameters" refers to parameters associated with a candidate template that specify how to provision the candidate resources upon deployment.

As an example, the term "production environment" refers to a live, active cloud computing system environment where code-based infrastructure (e.g., IaC) resources provide products and services used by end users. A production environment handles real data from users that must be kept secure. Often, a production environment is massive and spans many tenant operations. A production environment includes active cloud resources currently implemented with one or more parameter sets and/or entities.

The terms "test production environment" and "test environment" refer to a small subset of the production environment where a candidate template is deployed on a limited scale for security evaluation purposes. For example, a test production environment includes components and elements associated with the candidate template in addition to one or more copies of cloud resources from the production environment, as further described below. In this way, the test production environment allows a candidate template to be tested as if it were deployed in the production environment connected to cloud resources impacted outside the template, but in a safe, smaller, and limited offline sandbox area.

In this document, the term "pattern-based data structure" refers to resources within a template or cloud environment represented as patterns in a file or other data structure. For example, the pattern-based data structure is a network graph that represents infrastructure resources as nodes and properties or connections between resources as edges. In some implementations, the pattern-based data structure is a matrix or flat file. In general, a pattern-based data structure allows the preventative breach detection system to perform a security pattern analysis to detect resource vulnerability patterns. The term "hybrid pattern-based data structure" refers to a data structure that includes data from a template as well as from one or more cloud resources associated with the template from a production environment.

The term "resource vulnerability pattern" refers to a sequence or chain of infrastructure resources that are associated with vulnerabilities or misconfigurations. These vulnerabilities or misconfigurations can potentially be exploited by an attacker to gain unauthorized access or escalate privileges. In some cases, a resource vulnerability pattern identifies a vulnerable entry point that is connected to additional resources in a specific pattern. Attackers can exploit this pattern to gain unauthorized access to the cloud computing system. In the context of breach path analysis (i.e., security pattern analysis), a resource vulnerability pattern represents a possible breach path (e.g., resource vulnerability graph pattern) and may include a pivot resource.

Additional example implementations and details of the preventative breach detection system are discussed in connection with the accompanying figures, which are described next. For instance, FIG. 1 illustrates an example overview of implementing the preventative breach detection system to determine and prevent security threats caused by new code-based infrastructure before the security threats are implemented in a production cloud environment according to some implementations. FIG. 1 includes a series of acts 100 performed by the preventative breach detection system within a cloud computing system. While the series of acts 100 provides a high-level overview of the preventative breach detection system, additional details are provided in connection with subsequent figures.

As shown, the series of acts 100 includes act 102 of converting a candidate infrastructure template into a pattern-based data structure upon identifying the template in a cloud computing system. For example, the preventative breach detection system identifies a candidate code-based infrastructure template 112 that is ready to be deployed into a production environment of a cloud computing system 114, where the candidate template includes candidate resources (i.e., candidate cloud infrastructure resources) and candidate parameters.

Before deployment, the preventative breach detection system needs to assess the candidate template for security risks. To do so, however, the preventative breach detection system needs to overcome multiple barriers. First, the candidate template needs to be parsed or converted into a format that can be evaluated by a security pattern analysis tool. Accordingly, act 102 includes converting the candidate code-based infrastructure template 112 into a pattern-based data structure 116, such as a network graph.

Additionally, the preventative breach detection system needs to simulate real-world conditions and cloud resource impacts when assessing the security risks of implementing the candidate code-based infrastructure template, but in a way that does not expose the cloud computing system 114 to vulnerabilities. Accordingly, the preventative breach detection system generates an accurate simulation or test production environment for the candidate template.

To illustrate, act 104 includes identifying existing resources across a production environment that would be directly and indirectly connected to the template. For instance, the preventative breach detection system identifies connections between infrastructure and/or resources within the pattern-based data structure 116 and cloud resources in the cloud computing system 114. Based on the connections, both direct and indirect, the preventative breach detection system identifies relevant active cloud resources 122.

Act 106 includes generating a test production environment that includes a hybrid pattern-based data structure that combines the pattern-based data structure with the identified cloud resources. In various implementations, the preventative breach detection system enriches the pattern-based data structure 116 with the candidate code-based infrastructure template 112 in a hybrid pattern-based data structure 132. Furthermore, to house the hybrid pattern-based data structure 132, the preventative breach detection system generates a test production environment 134, which is a subset of the cloud computing system 114 with the candidate code-based infrastructure template 112 implemented. Indeed, the preventative breach detection system implements the pattern-based data structure 116 in a sandbox environment and adds the relevant active cloud resources 122 to the environment so that the true impact of deploying the candidate code-based infrastructure template 112 can be measured.

Act 108 includes determining a security risk level based on performing a security pattern analysis on the test production environment. For instance, the preventative breach detection system performs a security pattern analysis 142 on the hybrid pattern-based data structure 132 within the test production environment 134. In various implementations, the security pattern analysis 142 compares resource vulnerability patterns to the patterns of resources within the hybrid pattern-based data structure 132 to determine a resource vulnerability pattern 144 that matches.

Additionally, the preventative breach detection system can determine a security risk level based on the resource vulnerability pattern 144 and resources that are associated with the vulnerability pattern. For example, if the identified vulnerable resource creates a security threat that is the same as some current threat levels in the cloud computing system 114, then the preventative breach detection system may allow the candidate code-based infrastructure template 112 to be deployed. However, if the identified vulnerable resource creates an increased security threat in the cloud computing system 114, the preventative breach detection system may provide a security threat notification 146 and/or take additional preventative actions.

Figure 2:
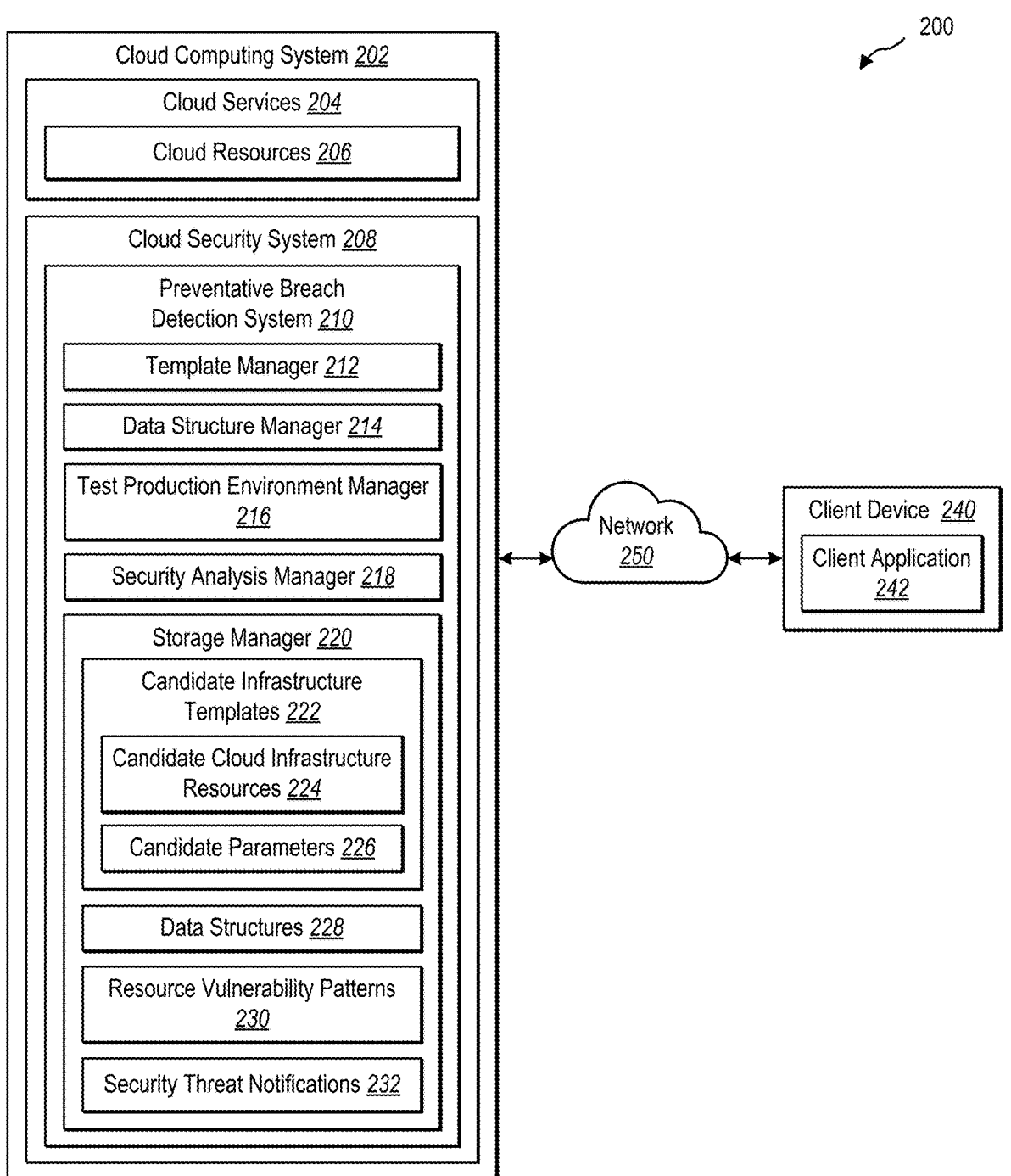
FIG. 2 illustrates an example computing environment where a preventative breach detection system is implemented in a cloud computing system.

With a general overview in place, additional details are provided regarding the components, features, and elements of the preventative breach detection system. To illustrate, FIG. 2 shows an example computing environment where a preventative breach detection system is implemented in a cloud computing system according to some implementations. In particular, FIG. 2 illustrates an example a of computing environment 200 with a cloud computing system 202 having various systems, including a preventative breach detection system 210. In some instances, the cloud computing system 202 represents a MICROSOFT AZURE® cloud computing system. While FIG. 2 shows example arrangements and configurations of devices and systems, other arrangements and configurations are possible.

As shown, the computing environment 200 includes a cloud computing system 202 that implements the preventative breach detection system 210 and a client device 240 connected via a network 250. Many of these components may be implemented on one or more computing devices, such as on one or more server devices. Some of these components may be implemented on a personal device. Further details regarding computing devices are provided below in connection with FIG. 7, along with additional details regarding networks, such as the network 250 shown.

As shown, the cloud computing system 202 includes cloud services 204 and a cloud security system 208. In various implementations, the cloud services 204 represent the production environment of the cloud computing system 202, which provides products and services for clients and end users. The cloud services 204 include cloud resources 206, which can include code-based infrastructure (e.g., IaC) resources. The cloud services 204 and cloud resources 206 may represent large portions of the cloud computing system 202 that facilitate tenants, resource groups, subscriptions, and other components of a production environment.

As also shown, the cloud computing system 202 includes the cloud security system 208. In various implementations, the cloud security system 208 manages various security aspects of the cloud computing system 202. For example, the cloud security system 208 manages identity and access management, data encryption, intrusion detection and prevention, firewalls, security information and event management, security audits, disaster recovery, access control, authorization, and others.

As shown in FIG. 2, the cloud security system 208 includes the preventative breach detection system 210. In some implementations, the preventative breach detection system 210 is located on a separate computing device within the cloud computing system 202, separate from the cloud services 204 and/or the cloud security system 208. In some instances, the preventative breach detection system 210 is located separately from the cloud computing system 202.

As mentioned earlier, the preventative breach detection system 210 provides a framework that utilizes hybrid pattern-based data structures, security pattern analysis, and resource vulnerability patterns to determine the security posture of a candidate code-based infrastructure based on its potential impact on the surrounding infrastructure in the production environment. As shown, the preventative breach detection system 210 includes various components and elements implemented in hardware and/or software. For example, the preventative breach detection system 210 includes a template manager 212, a data structure manager 214, a test production environment manager 216, a security analysis manager 218, and a storage manager 220. The storage manager 220 includes candidate infrastructure templates 222, candidate cloud infrastructure resources 224, candidate parameters 226, data structures 228, resource vulnerability patterns 230, and security threat notifications 232 among other data that the preventative breach detection system 210 may need to store and access.

The template manager 212 can identify code-based infrastructure templates, including candidate infrastructure templates 222, generated from various sources. In various implementations, the template manager 212 manages generating, editing, providing, modifying, and/or otherwise managing code-based infrastructure templates. In some instances, the template manager 212 identifies candidate infrastructure templates 222 ready for deployment, which include candidate cloud infrastructure resources 224 and candidate parameters 226.

The data structure manager 214 can generate data structures 228 from the candidate infrastructure templates 222. For example, the data structure manager 214 generates a pattern-based data structure and/or network graph version of a candidate template. In some implementations, the data structure manager 214 converts some or all of a test production environment and/or a production environment into a data structure that can be analyzed for security patterns. In various implementations, the data structure manager 214 generates hybrid data structures by adding related or relevant active cloud resources to pattern-based data structures for candidate templates.

The test production environment manager 216 can generate a test production environment that includes the hybrid data structures. For example, the test production environment manager 216 generates a smaller, sandbox-type testing version of the cloud computing system where a production-like version of a candidate infrastructure template could be evaluated.

The security analysis manager 218 can determine security risks based on performing a security pattern analysis, such as breach path analytics, on the hybrid data structures and/or test production environments to determine or identify resource vulnerability patterns 230. By determining or identifying one or more of the resource vulnerability patterns 230 in the hybrid data structures, the security analysis manager 218 can provide security threat notifications 232 indicating detected threat levels, as described below. In various implementations, the security analysis manager 218 may also perform various additional security actions based on detecting resource vulnerability patterns 230.

As shown, the computing environment 200 includes the client device 240. In various implementations, the client device 240 is associated with a user (e.g., a user client device), such as a user who is providing a candidate template for deployment to the preventative breach detection system 210. In some implementations, the client device 240 includes a client application 242, such as a web browser, mobile application, or another form of computer application for accessing and/or interacting with the cloud computing system 202 and/or the preventative breach detection system 210.

Figure 3:
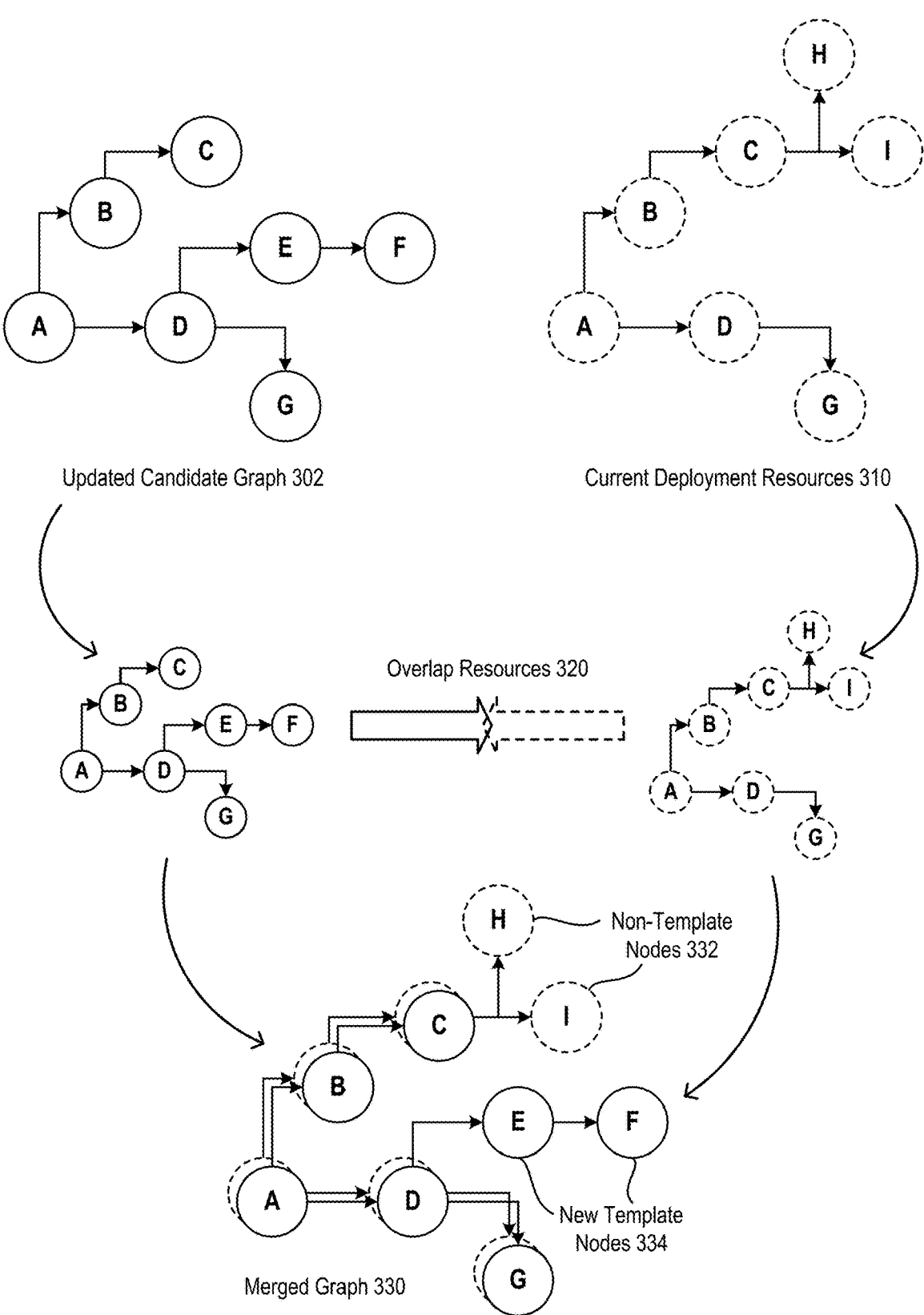
FIG. 3 illustrates an example diagram of security threats that may arise by adding a candidate updated code-based infrastructure template to current deployment resources in a production cloud environment.
Figure 4:
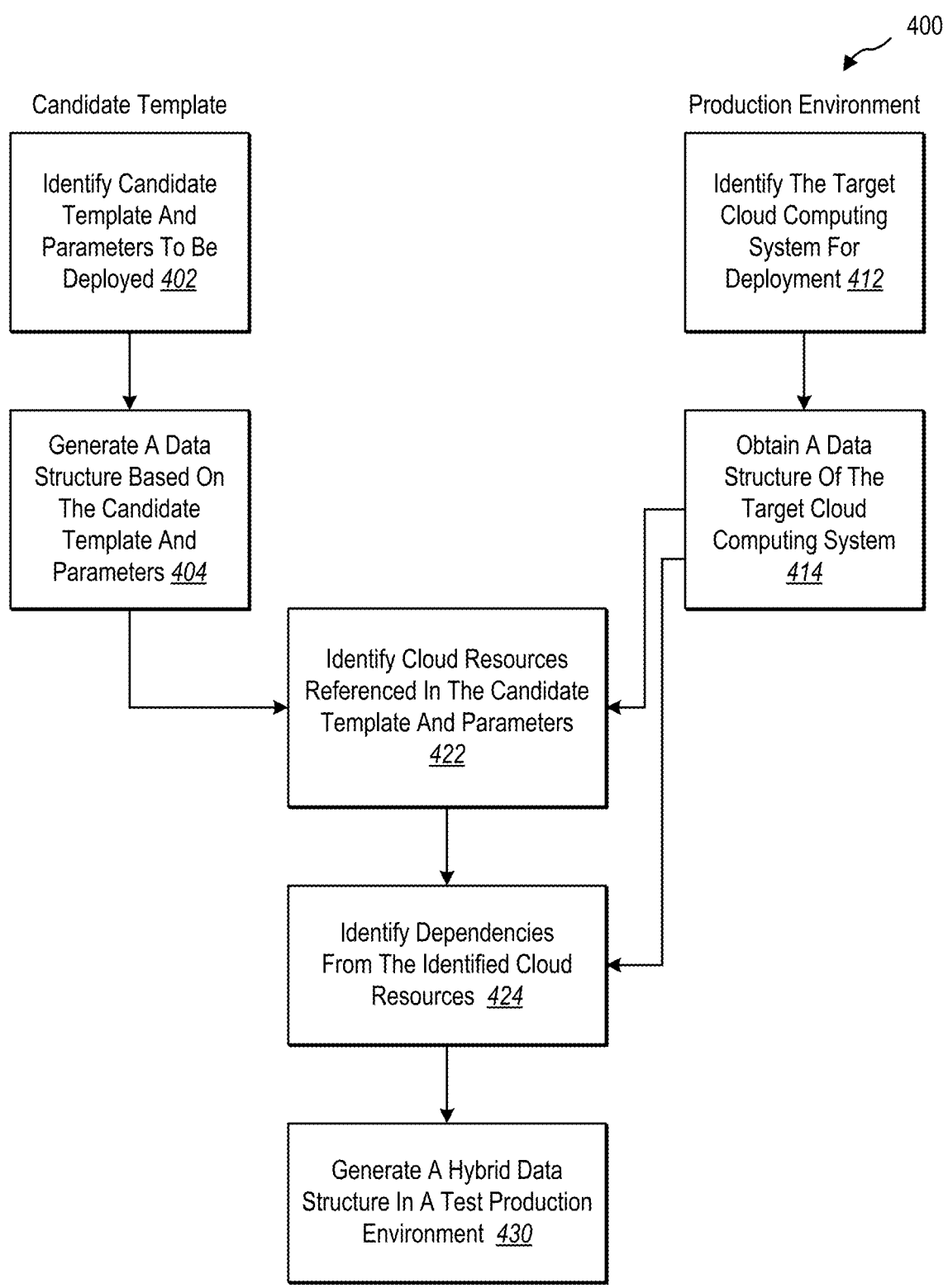
FIG. 4 illustrates an example diagram of generating a hybrid pattern-based data structure from a candidate code-based infrastructure template and correlated active cloud resources.
Figure 5:
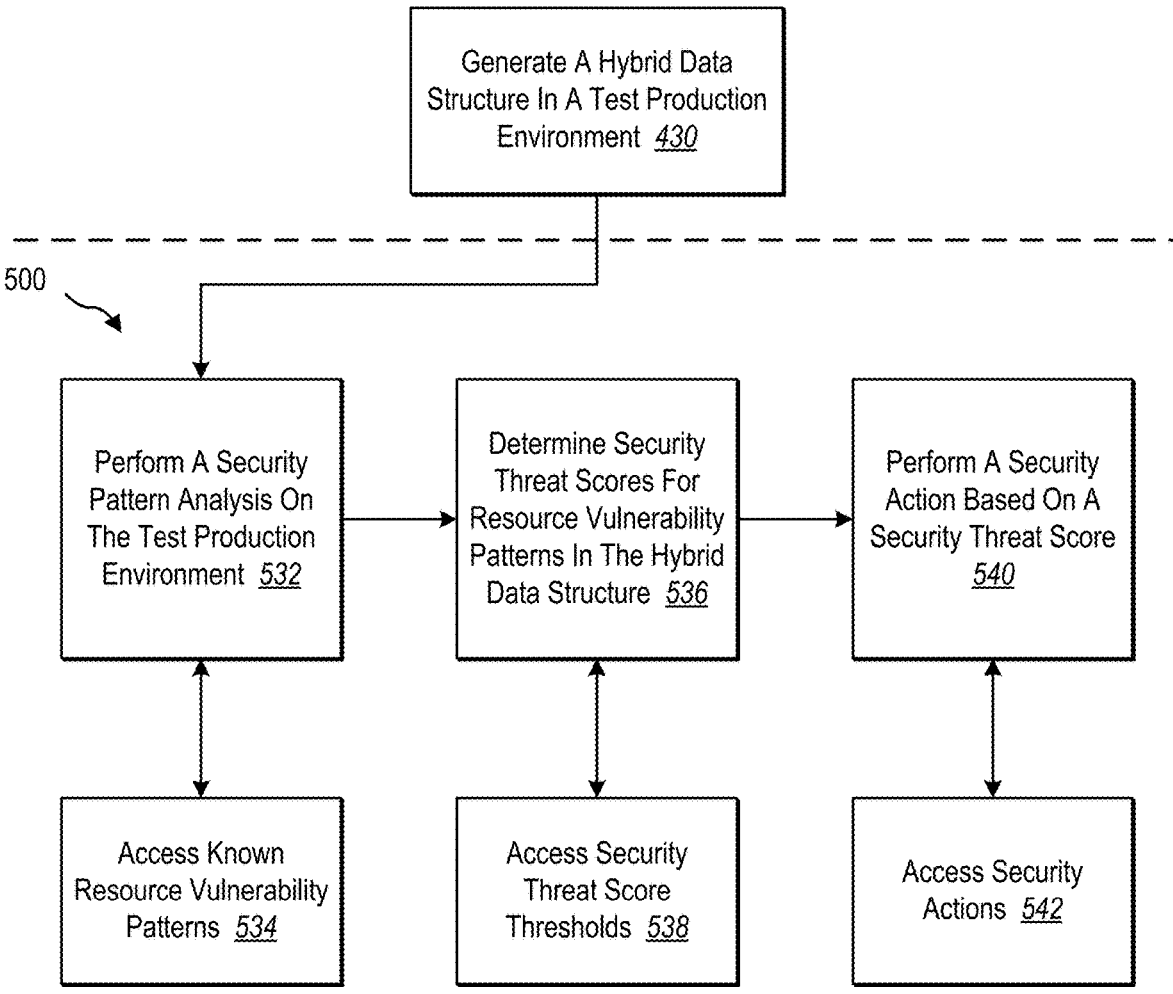
FIG. 5 illustrates an example diagram of preventing security resource breaches in a production cloud environment based on performing security pattern analysis on the hybrid pattern-based data structure.

FIG. 3 to FIG. 5 provide additional details about the preventative breach detection system 210, which determines and prevents security threats caused by new code-based infrastructure before the security threats are implemented in a production cloud environment. For example, FIG. 3 provides additional details about code-based infrastructure templates, FIG. 4 provides additional details about generating hybrid pattern-based data structures, and FIG. 5 provides additional details about performing security pattern analysis on the hybrid pattern-based data structure.

As mentioned above, FIG. 3 illustrates an example diagram of security threats that may arise from adding an updated (candidate) code-based infrastructure template to current deployment resources in a production cloud environment according to some implementations. Notably, FIG. 3 is used as an example to discuss how the preventative breach detection system 210 can detect and prevent security issues.

As shown, FIG. 3 includes an updated candidate graph 302 and current deployment resources 310. The updated candidate graph 302 may be a type of pattern-based data structure with nodes representing candidate infrastructure resources. For example, the updated candidate graph 302 may be generated from an updated candidate template ready to be deployed, which includes both candidate resources and candidate parameters (e.g., a parameter file).

In various implementations, the current deployment resources 310 represent the current state of the corresponding resources within a cloud computing system. For example, some or all of the cloud resources (e.g., nodes) were deployed from a previous candidate template deployment. While the updated candidate graph 302 and the current deployment resources 310 share many of the same resources, the different shading (e.g., white versus gray) signifies different states and/or parameters between the resources of the updated candidate graph 302 and the cloud resources of the current deployment resources 310.

FIG. 3 shows an act 320 of overlapping the updated candidate graph 302 with the current deployment resources 310 to generate a merged graph 330. For example, this represents what would happen if the updated candidate graph 302 was directly deployed into the cloud computing system. As shown, duplicate nodes from the updated candidate graph 302 overwrite corresponding nodes (i.e., A, B, C, D, G) from the current deployment resources 310 (or vice versa). As also shown, the merged graph 330 includes non-template nodes 332 (i.e., H and I) and new template nodes 334 (E and F).

In various implementations, the non-template nodes 332 correspond to non-managed nodes. For example, an administrator user manually added and configured one or both of the non-template nodes 332 within the cloud computing system. In some instances, a non-template node is an unintended entry point or a pivot resource. In some cases, while non-template nodes 332 may not pose a security risk under the current cloud computing system, the non-template node becomes a vulnerability when the updated candidate graph 302 is deployed.

In some implementations, the new template nodes 334 can introduce vulnerabilities into the cloud computing system. For example, if either of the new template nodes 334 result in an unintended entry point or is part of a resource vulnerability pattern, the exploit would not be identified until hours or days after deployment.

As mentioned above, some systems may attempt to determine vulnerabilities by analyzing a template before deployment. However, while some issues may be identified, many would not. To elaborate, in the example of FIG. 3, the non-template nodes 332 represent active cloud resources not within the candidate template (e.g., the updated candidate graph 302), but related or connected to nodes of the graph. If a vulnerability arises based on a resource vulnerability pattern that includes either of the non-template nodes 332, analyzing only the template would miss the security threat.

In contrast, if the merged graph 330 represents a hybrid graph or hybrid data structure in a test production environment, the preventative breach detection system 210 is able to quickly analyze the hybrid data structure and/or the test production environment and identify resource vulnerability patterns that would exist across resources should the updated candidate graph 302 be deployed. In other words, given a resource vulnerability pattern of "Node B connected to Node C connected to Node I" as a vulnerable pattern, the preventative breach detection system 210 would detect it before deployment into the live production system.

FIG. 4 illustrates an example diagram of generating a hybrid pattern-based data structure from a candidate code-based infrastructure template and correlated active cloud resources according to some implementations. As shown, FIG. 4 includes a series of acts 400 performed by the preventative breach detection system 210.

FIG. 4 includes a candidate template branch and a production environment branch. For instance, the production environment branch represents an active, live version of a cloud computing system that currently implements code-based infrastructure tools and services for various tenants, resource groups, and subscriptions.

As shown in the candidate template branch, the series of acts 400 includes act 402 of identifying a candidate template and parameters to be deployed. For example, the preventative breach detection system 210 generates, obtains, or otherwise identifies a candidate template ready for provisioning and deployment to the cloud computing system. The candidate template can correspond to a new template or an update of a previously deployed template.

As mentioned above, candidate templates can be deployed with parameters (integrated into the template or in an external file) to define the infrastructure and configuration of a cloud-based application or project. The parameters associated with a template can be fixed, static, dynamic, or customized. Various tools and systems can generate and/or modify templates. In some instances, the same template may be vulnerable with one set of parameters but not another set of parameters. Accordingly, when generating a data structure from a template, it is often necessary to include the parameters. This will also allow the preventative breach detection system 210 to better identify related or associated cloud resources.

Act 404 includes generating a data structure based on the candidate template and parameters. In various implementations, the preventative breach detection system 210 needs to parse or convert the candidate template into a format that is compatible with a security analysis that performs vulnerability searches and queries. In many cases, this includes a pattern-based data structure such as a candidate network graph, with nodes representing infrastructure resources and edges representing the type of relationship between nodes. In various instances, the groups of nodes and edges form patterns and chains within the candidate network graph.

In FIG. 4, within the production environment branch, act 412 includes identifying the target cloud computing system for deployment. In many cases, the candidate template is associated with a specific production environment of a target cloud computing system. For instance, the candidate template is associated with a specific subscription identifier, resource group, and/or tenant identifier.

Act 414 includes obtaining a data structure of the target cloud computing system. In various implementations, the preventative breach detection system 210 generates or otherwise obtains a pattern-based data structure, such as a graph, of the target cloud computing system. In some cases, parsing or converting the cloud computing system into a candidate network graph allows the preventative breach detection system 210 to better identify infrastructure and/or resources associated with the candidate template. In some instances, the preventative breach detection system 210 omits act 414 and obtains information from the cloud computing system in its raw form.

In many cases, a candidate template integrates into the tools and functions of the target cloud computing system. Accordingly, the candidate template may request, call, provide, and/or access data from active cloud resources within the target cloud computing system. The preventative breach detection system 210 determines these cloud resources related to the candidate resources within the candidate template to measure the true security impact of deploying the candidate template within the target cloud computing system.

To illustrate, act 422 includes identifying the cloud resources referenced in the candidate template and parameters. For example, the preventative breach detection system 210 determines which cloud resources in the target cloud computing system are associated with candidate resources from the candidate template (or the graph version of the candidate template).

Without deploying the candidate into the target cloud computing system, the preventative breach detection system 210 can analyze the candidate resources and candidate parameters in the candidate template to begin mapping associations between the candidate resources and related cloud resources. For example, the preventative breach detection system 210 identifies calls from candidate resources to cloud resources in the target cloud computing system. Depending on how the candidate parameters invoke a candidate resource, the candidate resource may call upon different cloud resources within the target cloud computing system.

Act 424 includes identifying dependencies of the identified cloud resources. In one or more implementations, a candidate resource in the candidate template references a chain of cloud resources within the target cloud computing system. For example, a candidate resource in the candidate template accesses a first cloud resource in the target cloud computing system that contains a second cloud resource, which has the permissions of a third cloud resource. In some implementations, the chain of resources may result in crossing over between subscription identifiers, resource groups, or tenants in a cloud computing system, as described below.

In various implementations, the preventative breach detection system 210 limits the number of identified dependent resources based on a maximum number of resources or total file size. By doing so, the preventative breach detection system 210 ensures that the resulting hybrid data structure does not become too large or inefficient to analyze. In some instances, the preventative breach detection system 210 stops adding dependencies from the target cloud computing system when the chain of dependencies exceeds a maximum security vulnerability pattern length.

With cloud resources directly and indirectly related to candidate resources identified, the preventative breach detection system 210 can compile an accurate simulated environment for testing the security impact of deploying the candidate template. To illustrate, act 430 includes generating a hybrid data structure in a test production environment. In various implementations, the preventative breach detection system 210 adds the cloud resources to the data structure of the candidate template. For instance, the preventative breach detection system 210 connects nodes representing the cloud resources to related candidate nodes in the candidate graph based on their relationship types (e.g., edges) to form a hybrid candidate graph.

In various implementations, the hybrid candidate graph forms a test production environment. For instance, the hybrid candidate graph merges the candidate graph with copies of the identified cloud resources. The test production environment provides a protected setting (e.g., a software testing sandbox) for accurately testing a candidate template along with copies of parts of the target cloud computing system that will be affected by deploying the candidate template for security breaches. In some implementations, the test production environment includes additional resources beyond the hybrid candidate graph, such as subscription and tenant data, identifiers, and/or boundaries.

In most implementations, the hybrid candidate graph and/or test production environment forms a small fraction of the production environment. For example, the test production environment includes a hybrid candidate graph corresponding to a single template while the production environment includes hundreds of thousands of deployed templates.

With the hybrid candidate data structure (e.g., the hybrid candidate graph) and/or the test production environment, the preventative breach detection system 210 can accurately evaluate the candidate template for security breaches and other security issues. For example, as discussed next, the preventative breach detection system 210 can perform a security pattern analysis to identify resource vulnerability patterns that would be caused by deploying the candidate template.

To illustrate, FIG. 5 shows an example diagram of preventing security resource breaches in a production cloud environment based on performing security pattern analysis on a hybrid pattern-based data structure according to some implementations. As shown, FIG. 5 includes a series of acts 500 performed by the preventative breach detection system 210. Additionally, the series of acts 500 continues from act 430 described above.

As shown, the series of acts 500 includes act 532 of performing a security pattern analysis on the test production environment. For instance, the preventative breach detection system 210 uses a security pattern analysis that uses predictive modeling to identify known, but often hidden, matches of vulnerability patterns within the hybrid candidate graph. As shown, the preventative breach detection system 210 performs act 532 in connection with act 534 of accessing known resource vulnerability patterns. In some instances, the known resource vulnerability patterns correspond to tools, tactics, and procedures that attackers employ to exploit resources and obtain unauthorized access to the target cloud computing system.

In various implementations, the security pattern analysis includes running or executing a set of queries that include patterns of known resource vulnerabilities to determine if the hybrid candidate graph includes a match to a known resource vulnerability. For example, by traversing the hybrid candidate graph, the preventative breach detection system 210 runs the known resource vulnerability patterns against infrastructure resource pattern combinations from the hybrid candidate graph to identify potential security threats based on matching resource vulnerability patterns.

In various implementations, the security pattern analysis includes a breach path analytics tool that identifies resource vulnerability patterns (e.g., resource vulnerability graph patterns), which include potential breach paths. For example, the breach path analytics tool maintains a collection of breach path patterns. In various implementations, the preventative breach detection system 210 uses the breach path analytics tool to run breach path pattern queries against the different resource pattern combinations in the hybrid candidate graph to identify matches (e.g., matches within a threshold value) indicating potential breach paths. In particular, breach path patterns help to identify resource pivots, which need to be further analyzed for security breaches.

As mentioned above, because the test production environment is a small fraction of the size of the production environment, the preventative breach detection system 210 efficiently performs the security pattern analysis in a brief time frame. For example, while a security pattern analysis of the production environment often takes hours to days, the preventative breach detection system 210 can perform a security pattern analysis of the test production environment in minutes (e.g., 60-90 seconds).

Upon determining a resource vulnerability pattern (e.g., potential breach path), the preventative breach detection system 210 can determine a security threat score. Act 536 includes determining security threat scores for resource vulnerability patterns in the hybrid data structure.

As part of determining a security threat score for an identified resource vulnerability pattern, the preventative breach detection system 210 determines which cloud resources are affected by the vulnerability. For example, the preventative breach detection system 210 determines whether an identified resource vulnerability pattern includes horizontal and/or vertical movement. Horizontal movement refers to exposure within the same subscription identifier or resource group. Vertical movement refers to exposure across subscription identifiers, resource groups, or tenant identifiers.

To illustrate, in some cases, the preventative breach detection system 210 uses a breach path analytics tool to identify breach paths, which reveal a pivot node at the end of the path. To determine a security threat score of the breach path, the preventative breach detection system 210 needs to determine the blast radius of how many other cloud resources could be affected due to the vulnerable breach path.

In connection with act 536, act 538 includes accessing security threat score thresholds. In various implementations, the security threat score threshold corresponds to the amount of exposure (e.g., blast radius) that a resource vulnerability pattern creates in terms of horizontal and vertical movement. For example, if the blast radius of a resource vulnerability pattern is limited to the same subscription identifier, the same resource group, and the same tenant identifier, then no security threat score thresholds are met, and the security threat score is low. A low security threat score corresponds to low risk which should be expected.

In one example, if the blast radius of a resource vulnerability pattern crosses over between different resource groups but stays within the same subscription identifier and the same tenant identifier, then a resource vulnerability pattern meets a first security threat score threshold and the security threat score is medium. A medium security threat score corresponds to medium risk that should typically be avoided but may be considered expected behavior.

If the blast radius crosses over between different subscription identifiers but stays within the same tenant identifier, then the resource vulnerability pattern meets a second security threat score threshold and the security threat score is high. A high security threat score corresponds to a high risk that should be avoided because actions and dependencies should be kept within the same subscriptions. Indeed, a high security threat score indicates that the candidate template includes candidate resources that form a resource chain crossing over subscription identifiers.

If the blast radius crosses over between different tenant identifiers, then the resource vulnerability pattern meets a third security threat score threshold and the security threat score is critical. A critical security threat score corresponds to a very high risk that could result in significant harm or damage to customers and end users. For example, a critical security threat score indicates that the candidate resources in a candidate template for a first tenant identifier include a resource vulnerability pattern that leads to unauthorized access of cloud resources of another tenant identifier.

Using the security threat score thresholds, the preventative breach detection system 210 can assign security threat scores to each identified resource vulnerability pattern. Because the security pattern analysis and security threat scores are determined in the test production environment before the candidate template is deployed, even high and critical security threat or risk scores will not introduce the corresponding security threats into the production environment.

Act 540 includes performing a security action based on a security threat score. Act 542 includes accessing security actions. In various implementations, the preventative breach detection system 210 determines whether a security action needs to be taken, based on the security threat score of a resource vulnerability pattern in the candidate template. For example, if only low security threat scores are found, the preventative breach detection system 210 may log the security threat scores but take no further action.

In some implementations, the preventative breach detection system 210 reports any security threat score of medium or above. For example, the preventative breach detection system 210 responds to a deployment request of the candidate template with one or more security threat score notifications indicating the resource vulnerability patterns and their security threat scores. The preventative breach detection system 210 can provide different levels of urgency based on whether the security threat score is medium, high, or critical.

In various implementations, the preventative breach detection system 210 provides a security threat notification if a resource vulnerability pattern has a security threat score that exceeds the current and/or highest threat level of the environment. For example, if the current environment has a low security threat score, then the preventative breach detection system 210 only reports medium or higher security threat scores. If the current environment has a medium security threat score, then the preventative breach detection system 210 only reports high or critical security threat scores. By doing so, the preventative breach detection system 210 ensures that additional risk is not unknowingly added to the cloud computing system by deploying candidate templates. In some implementations, the preventative breach detection system 210 always reports high and/or critical security threat scores.

In addition to reporting, in various implementations, the preventative breach detection system 210 takes additional action. For example, the preventative breach detection system 210 allows or prevents deployment in the active production environment based on the security threat scores of a candidate template. For example, the preventative breach detection system 210 allows the candidate template to deploy if the highest security threat score is a low risk score. In various implementations, the preventative breach detection system 210 prevents the candidate template from deploying if the security threat score is high or critical. In some instances, the preventative breach detection system

210 may warn or prevent deployment for a candidate template with a medium security threat score.

Turning now to FIG. 6, this figure illustrates an example series of acts of a computer-implemented method for preventing resource breaches in a cloud computing system according to some implementations. While FIG. 6 illustrates acts according to one or more implementations, alternative implementations may omit, add to, reorder, and/or modify any of the acts shown.

The acts in FIG. 6 can be performed as part of a method (e.g., a computer-implemented method). Alternatively, a computer-readable medium can include instructions that, when executed by a processing system with a processor, cause a computing device to perform the acts in FIG. 6. In some implementations, a system (e.g., a processing system comprising a processor) can perform the acts in FIG. 6. For example, the system includes a processing system and a computer memory including instructions that, when executed by the processing system, cause the system to perform various actions or steps.

As shown, the series of acts 600 includes act 610 of generating a data structure from a candidate template with candidate resources and parameters. For instance, in example implementations, act 610 involves generating a pattern-based data structure from a candidate code-based infrastructure template with candidate cloud infrastructure resources and candidate parameters. In some instances, the candidate code-based infrastructure template defines and provisions cloud infrastructure resources according to or based on parameters to implement one or more target cloud-based applications.

In some implementations, act 610 includes generating the pattern-based data structure by parsing the candidate code-based infrastructure template into a network graph with nodes representing the candidate cloud infrastructure resources and edges representing connection types between the nodes. In some implementations, generating the pattern-based data structure converts the candidate code-based infrastructure template into a format that is compatible with performing the security pattern analysis. In various implementations, the candidate code-based infrastructure template includes a set of candidate cloud infrastructure resources to perform or for executing a specific cloud-based application and the candidate code-based infrastructure template includes configurable candidate parameters for the candidate cloud infrastructure resources.

As further shown, the series of acts 600 includes act 620 of determining active cloud resources that correspond to the candidate resources and parameters in the template. For instance, in example implementations, act 620 involves determining related active cloud resources in the cloud computing system, which correspond to the candidate cloud infrastructure resources and the candidate parameters, within the candidate code-based infrastructure template. In some implementations, determining the related active cloud resources in the cloud computing system, which correspond to the candidate cloud infrastructure resources and the candidate parameters, includes determining a first active cloud resource directly connected to the candidate cloud infrastructure resources and determining a second active cloud resource indirectly connected to the candidate cloud infrastructure resources by or through one or more intermediary active cloud resources. In some implementations, an active cloud resource corresponding to the candidate cloud infrastructure resources is associated with a different tenant identifier than a tenant identifier associated with the candidate code-based infrastructure template.

As further shown, the series of acts 600 includes act 630 of generating a test production environment that includes a hybrid data structure that combines the candidate template with the active cloud resources. For instance, in example implementations, act 630 involves generating a test production environment that includes a hybrid pattern-based data structure, where the hybrid pattern-based data structure combines the candidate code-based infrastructure template with the related active cloud resources.

In some implementations, act 630 includes combining the candidate code-based infrastructure template with the related active cloud resources within the test production environment by creating or forming a connection chain between a template node and a set of related active cloud resources. In some implementations, the connection chain crosses over subscription identifiers in the test production environment. In some implementations, the connection chain crosses over tenant identifiers in the test production environment. In various implementations, the test production environment is a subset of a production environment, and/or performing or completing the security pattern analysis on the test production environment elapses over less time than completing the security pattern analysis in the production environment (e.g., occurs on an order of or within minutes, while performing the security pattern analysis on a production environment occurs on an order of or within hours).

As further shown, the series of acts 600 includes act 640 of performing a security pattern analysis on the test production environment to determine a resource vulnerability pattern in the hybrid data structure. For instance, in example implementations, act 640 involves determining a resource vulnerability pattern in the hybrid pattern-based data structure based on performing a security pattern analysis on the test production environment.

In some implementations, act 640 includes performing the security pattern analysis by comparing a set of known resource vulnerability patterns to segments of the hybrid pattern-based data structure and identifying a match between the resource vulnerability pattern of the set of known resource vulnerability patterns and a segment of the hybrid pattern-based data structure. In some implementations, the security pattern analysis is performed in the test production environment before the candidate code-based infrastructure template is implemented into an active production environment.

In some implementations, the candidate code-based infrastructure template is prevented from binding into the active production environment upon determining that the resource vulnerability pattern meets or satisfies the security threat threshold. In some implementations, determining that the resource vulnerability pattern meets the security threat threshold triggers the prevention of the candidate code-based infrastructure template from deploying into the active production environment. In some implementations, performing the security pattern analysis includes comparing a set of known resource vulnerability graph patterns to segments of the hybrid pattern-based network graph and identifying a match between the resource vulnerability graph pattern of the set of known resource vulnerability graph patterns and a segment of the hybrid pattern-based network graph.

As further shown, the series of acts 600 includes act 650 of providing a security threat notification based on the resource vulnerability pattern. For instance, in example implementations, act 650 involves providing a security threat notification based on determining that the resource vulnerability pattern meets a security threat threshold. In some implementations, act 650 includes the security threat threshold being based on the current highest threat level of a subscription identifier or a tenant identifier in the test production environment, and/or the security threat threshold being met based on the resource vulnerability pattern having a threat level above or higher than the current highest threat level. In some implementations, the security threat threshold is met based on the resource vulnerability pattern having a critical breach threat level. In some implementations, the resource vulnerability pattern represents a breach path vulnerability that is implemented in the test production environment by the hybrid pattern-based data structure.

In some instances, the series of acts 600 includes additional and/or different actions. For example, the series of acts 600 includes generating an additional pattern-based data structure from an additional candidate code-based infrastructure template; determining additional related active cloud resources in the cloud computing system that correspond to the additional candidate code-based infrastructure template; generating an additional test production environment that includes an additional hybrid pattern-based data structure, which combines the additional candidate code-based infrastructure template with the additional related active cloud resources; performing an additional security pattern analysis on the additional test production environment; and, based on not identifying or determining any resource vulnerability patterns that meet the security threat threshold, binding the additional candidate code-based infrastructure template within a production environment.

In various implementations, within the series of acts 600, the pattern-based data structure is a pattern-based network graph. In some instances, the series of acts 600 includes generating a test production environment that includes a hybrid pattern-based network graph and identifying or determining a resource vulnerability graph pattern in the hybrid pattern-based network graph based on performing a security pattern analysis.

Figure 7:
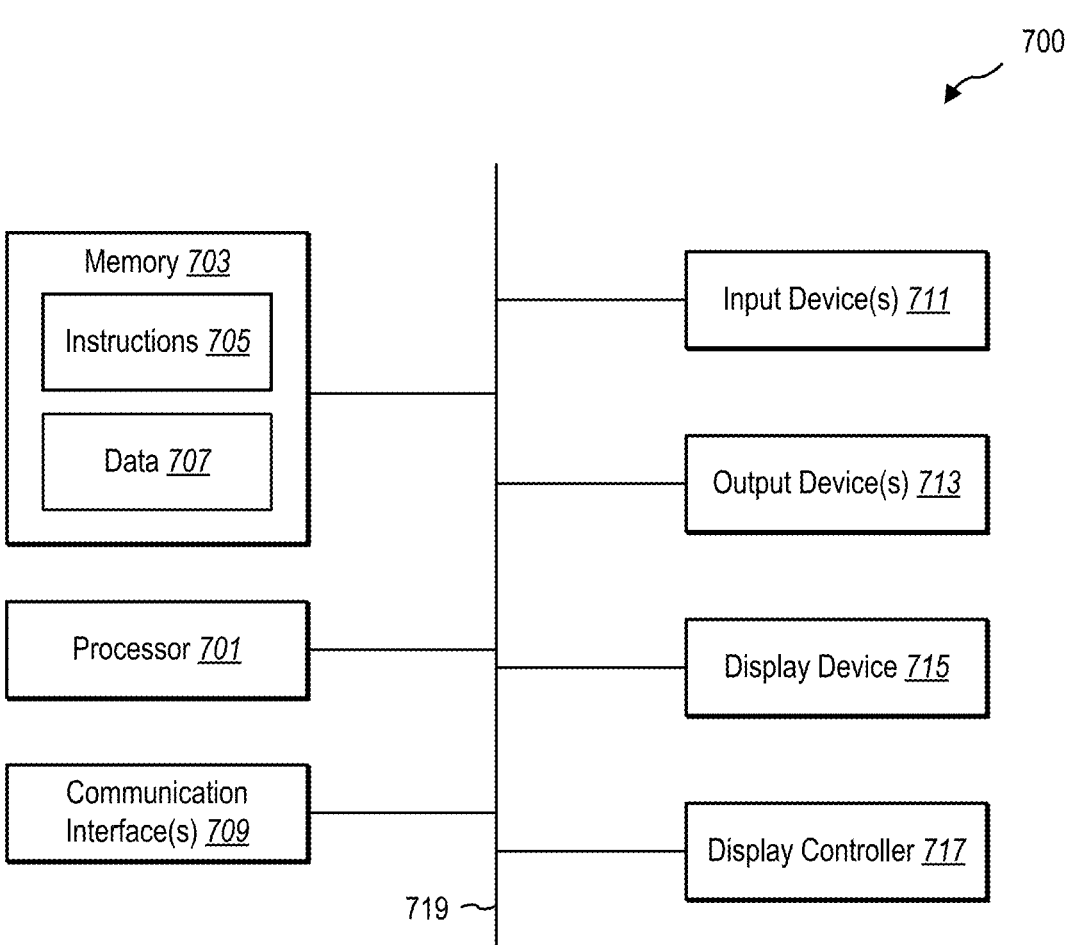
FIG. 7 illustrates example components included within a computer system that implements the preventative breach detection system.

FIG. 7 illustrates certain components that may be included within a computer system 700. The computer system 700 may be used to implement the various computing devices, components, and systems described herein (e.g., by performing computer-implemented instructions). As used herein, a "computing device" refers to electronic components that perform a set of operations based on a set of programmed instructions. Computing devices include groups of electronic components, client devices, server devices, etc.

In various implementations, the computer system 700 represents one or more of the client devices, server devices, or other computing devices described above. For example, the computer system 700 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 700 includes a processing system including a processor 701. The processor 701 may be a general-purpose single- or multi-chip microprocessor (e.g., an Advanced Reduced Instruction Set Computer (RISC) Machine (ARM)), a special-purpose microprocessor (e.g., a digital signal processor (DSP)), a microcontroller, a programmable gate array, etc. The processor 701 may be referred to as a central processing unit (CPU) and may cause computer-implemented instructions to be performed. Although the processor 701 shown is just a single processor in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 705 and the data 707 may be stored in the memory 703. The instructions 705 may be executable by the processor 701 to implement some or all of the functionality disclosed herein. Executing the instructions 705 may involve the use of the data 707 stored in the memory 703. Any of the various examples of modules and components described herein may be implemented, partially or wholly, as instructions 705 stored in memory 703 and executed by the processor 701. Any of the various examples of data described herein may be among the data 707 stored in memory 703 and used during the execution of the instructions 705 by the processor 701.

A computer system 700 may also include one or more communication interface(s) 709 for communicating with other electronic devices. The one or more communication interface(s) 709 may be based on wired communication technology, wireless communication technology, or both. Some examples of the one or more communication interface(s) 709 include a Universal Serial Bus (USB), an Ethernet adapter, a wireless adapter that operates according to an Institute of Electrical and Electronics Engineers (IEEE) 802.11 wireless communication protocol, a Bluetooth® wireless communication adapter, and an infrared (IR) communication port.

A computer system 700 may also include one or more input device(s) 711 and one or more output device(s) 713. Some examples of the one or more input device(s) 711 include a keyboard, mouse, microphone, remote control device, button, joystick, trackball, touchpad, and light pen. Some examples of the one or more output device(s) 713 include a speaker and a printer. A specific type of output device that is typically included in a computer system 700 is a display device 715. The display device 715 used with implementations disclosed herein may utilize any suitable image projection technology, such as liquid crystal display (LCD), light-emitting diode (LED), gas plasma, electroluminescence, or the like. A display controller 717 may also be provided to convert data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For clarity, the various buses are illustrated in FIG. 7 as a bus system 719.

This disclosure describes a subjective data application system within the framework of a network. In this disclosure, a "network" refers to one or more data links that enable electronic data transport between computer systems, modules, and other electronic devices. A network may include public networks such as the Internet as well as private networks. When information is transferred or provided over a network or another communication connection (either hardwired, wireless, or both), the computer correctly views the connection as a transmission medium. Transmission media can include a network and/or data links that carry the required program code in the form of computer-executable instructions or data structures, which can be accessed by a general-purpose or special-purpose computer.

In addition, the network described herein may represent a network or a combination of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the various systems described in this disclosure. Indeed, the networks described herein may include one or multiple networks that use one or more communication platforms or technologies for transmitting data. For example, a network may include the Internet or another data link that enables the transportation of electronic data between respective client devices and components (e.g., server devices and/or virtual machines thereon) of the cloud computing system.

Furthermore, upon reaching various computer system components, program code means in the form of computer-executable instructions or data structures can be automatically transferred from transmission media to non-transitory computer-readable storage media (devices), or vice versa. For example, computer-executable instructions or data structures received over a network or data link can be buffered in random-access memory (RAM) within a network interface module (NIC) and then eventually transferred to computer system RAM and/or to less volatile computer storage media (devices) at a computer system. Thus, it should be understood that computer-readable storage media (devices) can be included in computer system components that also (or even primarily) utilize transmission media.

Computer-executable instructions include instructions and data that, when executed by a processor, cause a general-purpose computer, special-purpose computer, or special-purpose processing device to perform a certain function or group of functions. In some implementations, computer-executable and/or computer-implemented instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the features or acts described above. Rather, the described features and acts are disclosed as example forms of implementing the claims.

Those skilled in the art will appreciate that the disclosure may be practiced in network computing environments with many types of computer system configurations, including personal computers, desktop computers, laptop computers, message processors, handheld devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium, including instructions that, when executed by at least one processor, perform one or more of the methods described herein (including computer-implemented methods). The instructions may be organized into routines, programs, objects, components, data structures, etc., which may perform particular tasks and/or implement particular data types, and which may be combined or distributed as desired in various implementations.

Computer-readable media can be any available medium that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, implementations of the disclosure can include at least two distinctly different kinds of computer-readable media: non-transitory computer-readable storage media (devices) and transmission media.

As used herein, computer-readable storage media (devices) may include RAM, ROM, EEPROM, CD-ROM, solid-state drives (SSDs) (e.g., based on RAM), Flash memory, phase-change memory (PCM), other types of memory, other optical disk storage, magnetic disk storage, or other magnetic storage devices, or any other medium that can be used to store desired program code means in the form of computer-executable instructions or data structures and that can be accessed by a general-purpose or special-purpose computer.

The steps and/or actions of the methods described herein may be interchanged with one another without departing from the scope of the claims. In other words, unless a specific order of steps or actions is required for the proper operation of the method being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a data repository, or another data structure), ascertaining, and the like. Also, "determining" can include receiving (e.g., receiving information), accessing (e.g., accessing data in memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is indicated by the appended claims rather than by the foregoing description. Changes that come within the meaning and range of equivalency of the claims are to be embraced within their scope.

What is claimed is:

1. A computer-implemented method for preventing resource breaches in a cloud computing system, comprising:

generating a pattern-based data structure from a candidate code-based infrastructure template with candidate cloud infrastructure resources and candidate parameters, wherein the candidate code-based infrastructure template defines and provisions cloud infrastructure resources according to parameters to implement one or more target cloud-based applications;

determining related active cloud resources in the cloud computing system that correspond to the candidate cloud infrastructure resources and the candidate parameters within the candidate code-based infrastructure template;

generating a test production environment that includes a hybrid pattern-based data structure, the hybrid pattern-based data structure combining the candidate code-based infrastructure template with the related active cloud resources;

determining a resource vulnerability pattern in the hybrid pattern-based data structure based on performing a security pattern analysis on the test production environment; and providing a security threat notification based on determining that the resource vulnerability pattern meets a security threat threshold.

2. The computer-implemented method of claim 1, wherein combining the candidate code-based infrastructure template with the related active cloud resources within the test production environment includes forming a connection chain between a template node and a set of related active cloud resources.

3. The computer-implemented method of claim 2, wherein the connection chain crosses over subscription identifiers in the test production environment.

4. The computer-implemented method of claim 3, wherein the connection chain crosses over tenant identifiers in the test production environment.

5. The computer-implemented method of claim 1, wherein performing the security pattern analysis includes:

comparing a set of known resource vulnerability patterns to the hybrid pattern-based data structure; and identifying a match between the resource vulnerability pattern of the set of known resource vulnerability patterns and the hybrid pattern-based data structure.

6. The computer-implemented method of claim 5, wherein the security pattern analysis is performed in the test production environment before the candidate code-based infrastructure template is implemented into an active production environment.

7. The computer-implemented method of claim 6, wherein determining that the resource vulnerability pattern meets the security threat threshold triggers prevention of the candidate code-based infrastructure template from deploying into the active production environment.

8. The computer-implemented method of claim 1, wherein:

the security threat threshold is based on a current highest threat level of a subscription identifier or a tenant identifier in the test production environment; and the security threat threshold is met based on the resource vulnerability pattern having a threat level above the current highest threat level.

9. The computer-implemented method of claim 1, wherein the security threat threshold is met based on the resource vulnerability pattern having a critical breach threat level.

10. The computer-implemented method of claim 1, wherein generating the pattern-based data structure includes parsing the candidate code-based infrastructure template into a network graph with nodes representing the candidate cloud infrastructure resources and edges representing connection types between the nodes.

11. The computer-implemented method of claim 1, wherein:

the test production environment is a subset of a production environment; and completing the security pattern analysis on the test production environment elapses over less time than completing the security pattern analysis in the production environment.

12. The computer-implemented method of claim 1, wherein generating the pattern-based data structure converts the candidate code-based infrastructure template into a format that is compatible with performing the security pattern analysis.

13. The computer-implemented method of claim 1, wherein:

the candidate code-based infrastructure template includes a set of candidate cloud infrastructure resources to perform a specific cloud-based application; and the candidate code-based infrastructure template includes configurable candidate parameters for the candidate cloud infrastructure resources.

14. The computer-implemented method of claim 1, wherein the resource vulnerability pattern represents a breach path vulnerability implemented in the test production environment by the hybrid pattern-based data structure.

15. The computer-implemented method of claim 1, further comprising:

generating an additional pattern-based data structure from an additional candidate code-based infrastructure template;

determining additional related active cloud resources in the cloud computing system that correspond to the additional candidate code-based infrastructure template;

generating an additional test production environment that includes an additional hybrid pattern-based data structure, which combines the additional candidate code-based infrastructure template with the additional related active cloud resources;

performing an additional security pattern analysis on the additional test production environment; and based on not determining any resource vulnerability patterns that meet the security threat threshold, binding the additional candidate code-based infrastructure template within a production environment.

16. A computer-implemented method for preventing resource breaches in a cloud computing system, comprising:

generating a pattern-based network graph from a candidate code-based infrastructure template with candidate cloud infrastructure resources and candidate parameters, wherein the candidate code-based infrastructure template defines and provisions cloud infrastructure resources according to parameters to implement one or more target cloud-based applications;

determining related active cloud resources in the cloud computing system that correspond to the candidate cloud infrastructure resources and the candidate parameters within the candidate code-based infrastructure template;

generating a test production environment that includes a hybrid pattern-based network graph, the hybrid pattern-based network graph combining the candidate code-based infrastructure template with the related active cloud resources;

determining a resource vulnerability graph pattern in the hybrid pattern-based network graph based on performing a security pattern analysis on the test production environment; and providing a security threat notification based on determining that the resource vulnerability graph pattern meets a security threat threshold.

17. The computer-implemented method of claim 16, wherein performing the security pattern analysis includes:

comparing a set of known resource vulnerability graph patterns to the hybrid pattern-based network graph; and identifying a match between the resource vulnerability graph pattern of the set of known resource vulnerability graph patterns and the hybrid pattern-based network graph.

18. The computer-implemented method of claim 16, wherein determining the related active cloud resources in the cloud computing system that correspond to the candidate cloud infrastructure resources and the candidate parameters include:

determining a first active cloud resource directly connected to the candidate cloud infrastructure resources; and determining a second active cloud resource indirectly connected to the candidate cloud infrastructure resources by one or more active cloud resources.

19. The computer-implemented method of claim 18, wherein an active cloud resource corresponding to the candidate cloud infrastructure resources is associated with a different tenant identifier than a tenant identifier associated with the candidate code-based infrastructure template.

20. A system comprising:

a processing system having a processor; and a computer memory including instructions that, when executed by the processing system, cause the system to carry out operations comprising:

generating a pattern-based data structure from a candidate code-based infrastructure template with candidate cloud infrastructure resources and candidate parameters, wherein the candidate code-based infrastructure template defines and provisions cloud infrastructure resources according to parameters to implement one or more target cloud-based applications;

determining related active cloud resources in a cloud computing system that correspond to the candidate cloud infrastructure resources and the candidate parameters within the candidate code-based infrastructure template;

generating a test production environment that includes a hybrid pattern-based data structure, the hybrid pattern-based data structure combining the candidate code-based infrastructure template with the related active cloud resources;

determining a resource vulnerability pattern in the hybrid pattern-based data structure based on performing a security pattern analysis on the test production environment; and providing a security threat notification based on determining that the resource vulnerability pattern meets a security threat threshold.

\* \* \* \* \*